Figure 1:
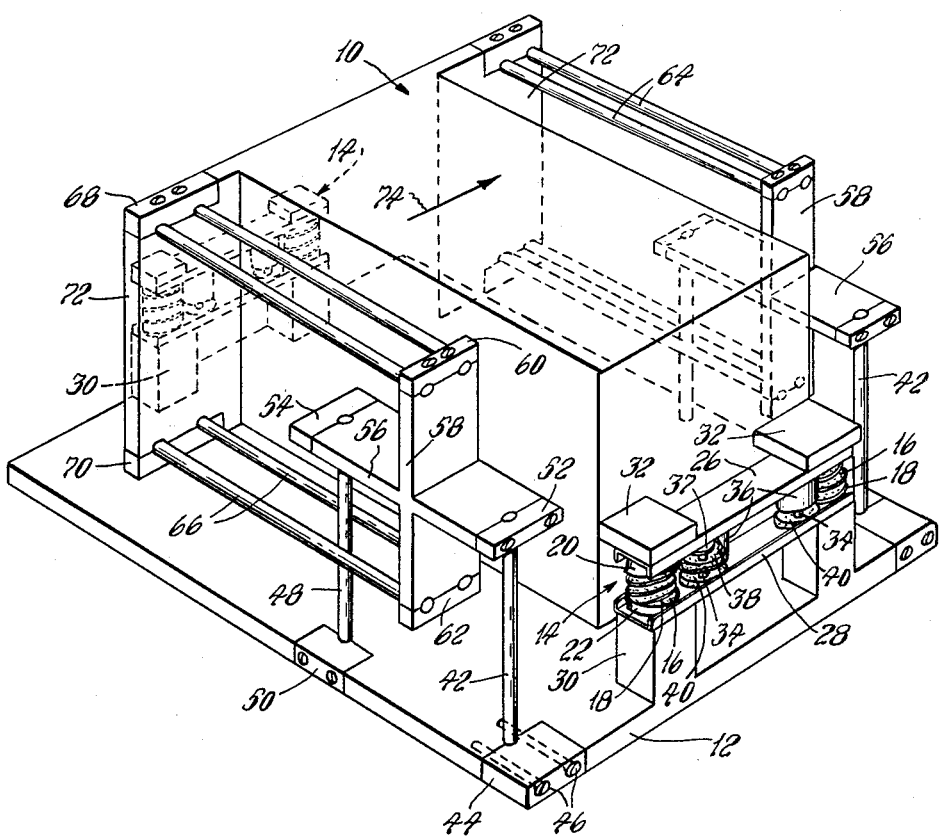

April 12, 1960     R. J. DICKIE     2,932,482
STABILIZED MOUNTING SYSTEM

Filed May 26, 1958     3 Sheets-Sheet 1

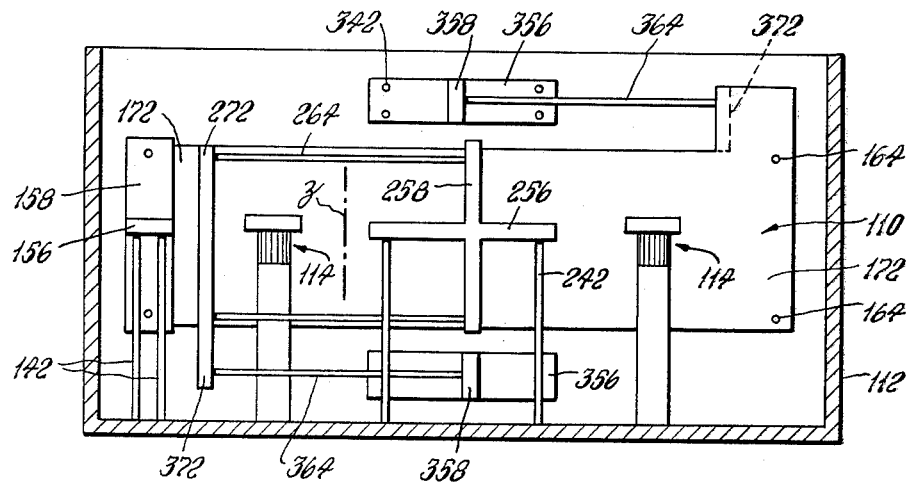
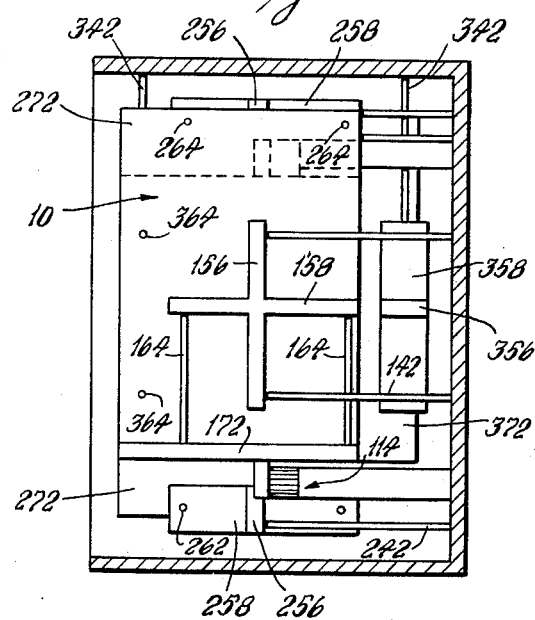

United States Patent Office 2,932,482
Patented Apr. 12, 1960

2,932,482

STABILIZED MOUNTING SYSTEM

Robert J. Dickie, Maywood, N.J., assignor to Robinson Aviation, Inc., Teterboro, N.J., a corporation of New York Application May 26, 1958, Serial No. 737,952

11 Claims. (Cl. 248—358)

The present invention relates to a mounting system for objects in which the object is supported in such manner with relation to another object as to be free for limited translatory movement in any direction relative to said second object but which is stabilized against angular motion relative to said second object about any one or more of the axes about which such angular motion might occur. The mounting system of the present invention finds particular utility in the mounting of objects which it is desired to isolate from vibration or shock and which must be maintained in a definite angular relationship along one or more axes relative to the second object upon which the first object is supported. As examples of particular embodiments of the present invention there may be cited the mounting of objects such as gyroscopes, accelerometers, antenna and similar angle-measuring devices, in vehicles such as land vehicles, aircraft, missiles and the like. In the case of such embodiments it will be apparent that it would be desirable to isolate the instrument from vibrations and shock originating in the vehicle and in order to effectively accomplish this purpose it is necessary to provide for controlled and limited relative motion in all directions between the instrument and the vehicle. However, the provision for such relative movement which may be achieved by mounting the instrument upon suitable cushions will also permit angular movement between the instrument and the vehicle, for example, twisting of the instrument about one or more axes. Various systems have been devised for the stablizing of cushion-mounted instruments but so far as applicant is aware, all such systems have involved the provision of relatively moving parts such as rotary or sliding bearings, pivoted levers, ball and socket joints, and the like.

It is an object of the present invention to provide stabilizing devices for preventing angular motion of one object relative to another about one or more axes while permitting translatory motion in any direction between said objects. Other and further objects of the present invention will appear from a consideration of the detailed description of a preferred form of the present invention taken in connection with the drawings accompanying and forming a part of this specification.

The present invention achieves the objectives set forth above by the use of a plurality of interrelated parallel motion devices which are devoid of sliding or relatively rotating parts. The individual elements of such parallel motion devices in their simplest form may comprise, in effect, a closed geometric figure such as a rectangle having two opposed sides made of rigid material and two opposed sides made of spring rods or wires rigidly secured at their opposite ends to the rigid side members. Within the limits of load for which the device is designed the flexing of the spring rods or wires will permit translatory motion of one rigid member relative to the other in any direction substantially within a given plane but will not permit rotation of one rigid member relative to the other about any axis which is perpendicular to the plane within which the spring rods lie. By properly arranging a plurality of such parallel motion devices they may be availed of to permit translation while preventing rotation of an object about any one or more of three mutually perpendicular axes. Accordingly, an object may be supported upon cushions for the isolation of vibration and may be equipped with a suitable arrangement of parallel motion devices of the type just discussed to permit translation of the object, incident to the isolation of vibration, along all three axes while preventing rotation of the object about any one or more of such axes.

Figure 2:
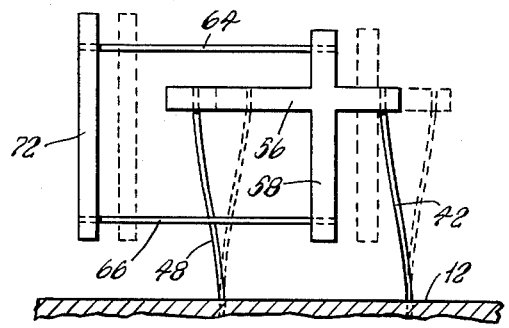
Figure 3:
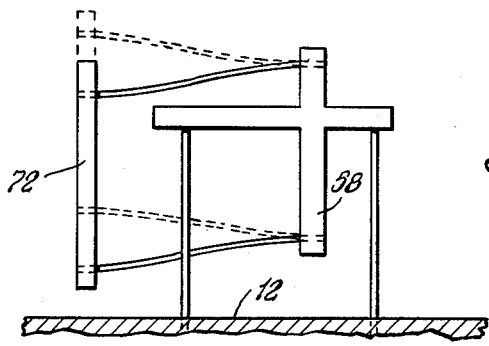
Figure 4:
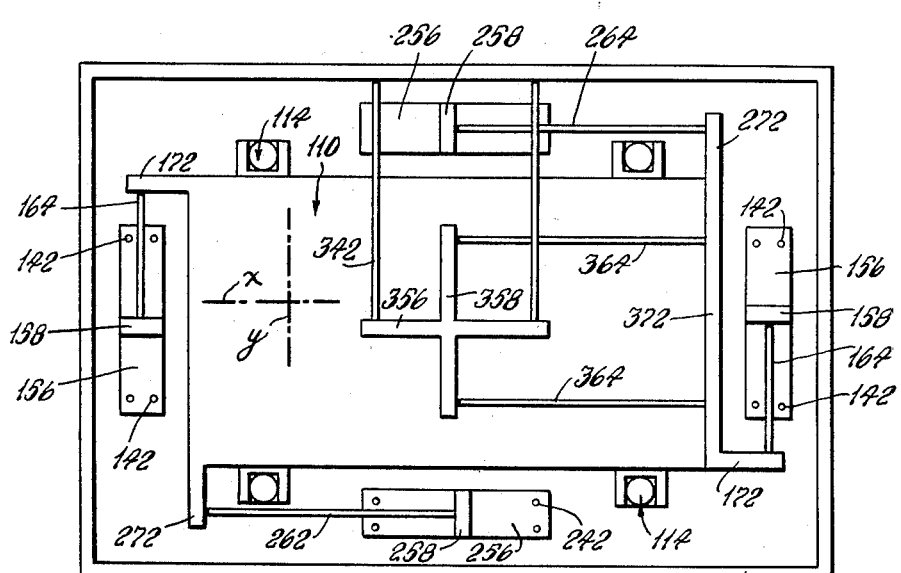

In the drawings which show preferred, but not necessarily the only embodiments of the present invention, Fig. 1 is a somewhat diagrammatic perspective view of a stabilized mounting system embodying the present invention;

Figs. 2 and 3 are diagrammatic views illustrating the operation of elements shown in Fig. 1; and Figs. 4, 5 and 6, respectively, are diagrammatic plan, elevational and side views of a different form of the present invention.

Referring now to the drawings, in Fig. 1 there is shown an object 10 supported upon a base 12. For the purposes of the present disclosure it may be assumed that the base 12 is rigidly secured to the frame of a vehicle which may be a land, water or air vehicle. The object 10 may comprise any sort of instrument which it is desired to isolate from vibration and shock originating in the vehicle and necessarily transmitted to the base 12. The object 10 may be a gyroscope, for example, or any sort of device which it is desired to maintain in definite angular relationship with the vehicle along any one or more of three mutually perpendicular axes.

For the purpose of isolating the object 10 from vibrations and shock, it may be mounted upon a plurality of cushioning devices 14. While the cushioning devices 14 may take any desired form and thus be made of metal mesh, coil springs, rubber or other suitable material, it is preferred to utilize as the cushioning devices apparatus similar to that shown in U.S. Patent No. 2,687,270 granted August 24, 1954, to C. S. Robinson. Thus, as shown in the present drawings, the cushioning devices 14 comprise cushions 16 of metal mesh surrounded by relatively light coil springs 18, the opposite ends of each such unit being received in cups 20 and 22 secured to channel numbers 26 and 28 respectively. The lower channel members 28 may be secured to supports 30 extending vertically from the base 12 while the upper channel members 26 may be secured to lugs 32 rigidly fastened to the object or instrument 10. Preferably the cushioning members 14 are so positioned with respect to the instrument 10 as to support the same through the lugs 32 in a plane which includes or substantially includes the center of gravity of the instrument 10. It will be understood that the particular positioning of the cushioning members 14 thus will be selected in accordance with the particular configuration and weight distribution of the elements making up the instrument 10.

Preferably also the vibration isolating and shock absorbing devices for supporting the object 10 include limiting means which afford cushioned stops for limiting movement of the object 10 in vertical and in horizontal directions. Thus, as shown in greater detail in said Patent 2,687,270, there may be provided studs 34 rigidly secured in vertical position upon the lower channel member 28. The studs 34 extend respectively into housings 36 secured to the upper channel member 26. At the upper end of each stud 34 are secured washers 37 which are adapted to engage cushions 38 which are located within the housing 36 and which surround the studs 34. Another cushion 40 may be positioned around each of the studs 34 and resting upon the lower channel member 28. As will be apparent, the limiting device just described serves to limit the extent of horizontal movement by cushioned impact between the studs 34 and the cushions 38. Upward vertical movement is limited by impact between the washers 37 and the upper surface of the cushion 38. Downward vertical movement is limited by cushioned impact between the lower surface of the housing 36 and the cushion 40.

The vibration-isolating and shock-absorbing devices 14, just described, or any equivalent thereof, will permit a limited amount of translatory as well as rotational movement of the object 10 relative to the base 12 and if it is desired to eliminate rotational movement relative to the base 12 along one or more of the axes along which such movement might occur, it is necessary to provide additional control or stabilizing means. As has been pointed out, devices of the latter type heretofore provided have included relatively moving parts wherein surfaces slide or rotate upon one another. Such surfaces must be cleaned and lubricated and cannot be depended upon for reliable operation without adequate servicing and maintenance. Also to reduce maintenance to a practical level the sliding or rotary fits must be relatively loose thus introducing relatively small and erratic errors in angular relationship between the instrument and the vehicle in which it is mounted.

In Fig. 1 there is shown apparatus embodying the present invention for the purpose of preventing rotation about parallel horizontal axes having a specific relationship with the instrument 10 while permitting linear translation of the instrument in any direction within the limits established by the limiting devices in the suspension system. It should be noted that the apparatus shown in Fig. 1 will not prevent limited rotation of the instrument 10 about vertical axes and about horizontal axes which are perpendicular to the axes about which movement is precluded.

As shown in Fig. 1 a rod 42 of resilient material, for example spring steel, is secured in vertical upstanding position to the base 12. A convenient method of securing the rod 42 is shown in the drawing and consists of a clamping block 44 which is notched to receive the rod 42 and which may be secured in clamping position as by screws 46. A second rod 48 is secured by a clamp 50 in a vertical upstanding position to the base 12. The rods 42 and 48 are parallel and preferably are disposed in a vertical plane which is parallel with one of the three major axes of the instrument 10. The upper ends of the rods 42 and 48 are secured as by clamps 52 and 54 to a rigid intermediate member 56. From a consideration of the apparatus so far described it will be apparent that the rigid base member 12 and the rigid intermediate member 56 comprise two opposed sides of a rectangle while the flexible rods 42 and 48 comprise the two remaining sides of such rectangle. So long as no load is applied which is sufficient to cause buckling of one or the other of the rods 42 and 48, the rigid intermediate member 56 may be moved horizontally, as illustrated in Fig. 2, with respect to the base 12 and such movements may be either linear or rotational about vertical axes. The rigid intermediate member 56 cannot move vertically with respect to the base plate 12 except for such slight vertical displacement as is caused by the foreshortening of the rods 42 and 48 as they flex.

The rigid intermediate member 56 includes not only the horizontal portion to which attention has been directed, but also a vertically extending portion 58 provided with clamps 60 and 62 for rigidly securing upper and lower pairs, respectively, of spring rods 64 and 66. The spring rods 64 and 66 extend horizontally and lie in parallel vertical planes which are in turn parallel with the plane of the rods 42 and 48. It will be noted that the lower pair of rods 66 straddle the rod 48. This particular construction is preferred since it is symmetrical and thus devoid of couples.

The opposite ends of the rods 64 and 66 are secured as by clamps 68 and 70, respectively, to a flange 72 which is rigidly secured to the instrument 10. Thus the portion 58 of the intermediate member 56 and the flange 72 constitute rigid opposed sides of a rectangle while the bars 64 and 66 constituted the remaining sides thereof. Movements of the member 72 relative to the member 58 will be limited as described above. Thus as shown in Fig. 3 the member 72 may move vertically relative to the member 58 and thus relatively to the base plate 12. The combined effect of the horizontal translations illustrated in Fig. 2 and the vertical translations illustrated in Fig. 3 will permit movement of the instrument 10 relative to the base 12 in linear or curved paths having vertical and horizontal components. However, the instrument 10 cannot rotate relative to the base plate 12 about any axis which is normal to the plane of the paper on which Figs. 2 and 3 appear.

As shown in Fig. 1, a complete set of duplicate parts 42 through 72 may be provided on each side of the instrument 10. This is preferable from the standpoint of symmetrical construction and the avoidance of couples.

If the instrument 10 illustrated in Fig. 1 is mounted in a vehicle in such direction that the arrow 74 extends fore and aft of the vehicle, the instrument 10 cannot rotate relative to the vehicle on any axis fore and aft of the vehicle. However, it could rotate relative to the vehicle athwartships or vertically thereof. In other words the axis of the instrument 10 will be maintained in fixed relation with the vehicle with respect to roll but not with respect to pitch or yaw. Obviously the instrument 10 may be positioned with the arrow 74 directed vertically or athwart the vehicle in which event such other axes may be made to remain fixed with respect to the vehicle.

If it is desired to stabilize the instrument 10 with respect to two mutually perpendicular axes an additional pair of parts 42 through 72 may be provided to stabilize the instrument on the desired further axis. In the event stabilization is desired in all directions, a third pair of such parts may be provided.

In Figs. 4 through 6 three pairs of stabilizing devices embodying the present invention are shown associated with an instrument for the purpose of stabilizing it against rotation relative to the vehicle about any axis. Nevertheless, the instrument remains free for translation in linear or curved paths in any direction whereby it may be effectively isolated from shock and vibration.

In said Figs. 4 through 6 an instrument 110 is shown mounted within a rigid enclosure 112 which may comprise a rectangular box adapted to be rigidly secured to the frame of the vehicle. The instrument 110 is mounted in vibration isolating cushioning devices 114 which may be of any suitable form and preferably may be similar to the devices shown in Patent 2,687,270. In any event, it is preferable that the cushioning devices 114 include provisions for limiting the extent of relative movement between the instrument 110 and the enclosure 112. In order to stabilize the instrument 110 against rotation about any axis relative to the enclosure 112 there may be provided three sets of parallel motion devices constructed in accordance with the present invention and oriented so as to be operative with respect to the three mutually perpendicular axes of the instrument 110.

Thus there may be provided at each end of the instrument 110 as viewed in Fig. 4, a complete set of parts 142 through 172 corresponding in essential respects to the parts 42 through 72 described in connection with Figs. 1, 2 and 3. These parts, as described above, will serve to stabilize the instrument 110 against rotation relative to the enclosure 112 about the axis *x* indicated in Fig. 4. Two complete sets of parts 242 through 272 may be provided at the front and rear of the instrument 110 as viewed in Fig. 4 which serve to stabilize the instrument 110 against rotation relative to the enclosure 112 about any axis parallel with the axis y indicated in Fig. 4. A third complete set of parts 342 through 372 may be provided above and below the instrument 110 to stabilize the same against rotation relative to the enclosure 112 about the axis z indicated in Fig. 5.

While several illustrative embodiments of the invention have been disclosed in detail, it will be understood that various changes may be made in the continuation and arrangement of the several parts without departing from the principles and scope of the invention as defined by the appended claims.

What is claimed is:

1. A structure for supporting an object from a body subject to shock and vibration which comprises means including shock and vibration isolating means for connecting said object with said body, and means for preventing rotation of said object about at least one axis of the same relative to said body, said last mentioned means comprising a plurality of members each supported by spaced parallel resilient rods projecting from said body at opposite sides of said object, said rods being normally disposed in a direction transverse to the axis about which said rotation is to be prevented, and other spaced parallel resilient rods connecting each of said members with said object, said other rods being normally disposed in a direction transverse to said axis and also to said first mentioned rods.

2. A structure of the character set forth in claim 1 in which at least one of said other resilient rods for each of said members is connected therewith at a point outwardly of the ends of said first mentioned rods, and another of said other resilient rods is connected with said member inwardly of the ends of said first mentioned rods.

3. A structure of the character set forth in claim 1 in which a number of said other of said resilient rods are connected with said member at points outwardly of the ends of said first mentioned rods, and a number of said other resilient rods are connected with said member inwardly of the ends of said first mentioned rods.

4. A structure of the character set forth in claim 1 in which each of said members is cross-shaped, said first mentioned rods being connected with portions of the related member in one plane, and said other of said rods for such member being connected with the latter in a plane perpendicular to said first mentioned plane.

5. A structure of the character set forth in claim 4 in which a plurality of said other of said rods is connected with said member at each side of the axis thereof.

6. A structure for supporting an object from a body subject to shock and vibration which comprises means including shock and vibration isolating means for connecting said object with said body, and means for preventing rotation of said object relative to said body about two axes of said object which are perpendicular to each other, said last mentioned means comprising two pairs of members each supported by spaced parallel resilient rods projecting from said body, said members of each pair being disposed at opposite sides of said object, the members of one pair extending at right angles to those of the other, said rods for one of said pairs of members being disposed normally in a direction transverse to one of the axes about which said rotation is to be prevented, said rods for another of said pairs of members being disposed normally in a direction transverse to the other of said axes, and other spaced parallel resilient rods connecting each of said members with said object, said other rods for each of said members being disposed normally in a direction transverse to the related axis and also to the supporting rods for said member.

7. A structure of the character set forth in claim 6 in which at least one of said other rods for each of said members is connected with the latter at a point outwardly of the ends of the supporting rods for such member, and another of said other resilient rods for such member is connected therewith inwardly of the ends of such supporting rods.

8. A structure of the character set forth in claim 6 in which each of said members is cross-shaped, said first mentioned rods being connected with the ends of the arms of the related cross member which are disposed in one plane, and said other of said rods for such member being connected with the arms thereof which are disposed in a plane perpendicular to said first mentioned plane.

9. A structure for supporting an object from a body subject to shock and vibration which comprises means including shock and vibration isolating means for connecting said object with said body, and means for preventing rotation of said object relative to said body about three axes of said object which are mutually perpendicular to each other, said last mentioned means comprising three pairs of members each supported by spaced parallel resilient rods projecting from said body, said members of each pair being disposed at opposite sides of said object, the members of each pair extending at right angles to those of each of the other pairs, said rods for each of said pairs of members being disposed normally in a direction transverse to a related one of the axes about which said rotation is to be prevented, and other spaced parallel resilient rods connecting each of said members with said object, said other rods for each of said members being disposed normally in a direction transverse to the related axis and also to the supporting rods for said member.

10. A structure of the character set forth in claim 9 in which at least one of said other rods for each of said members is connected with the latter at a point outwardly of the ends of the supporting rods for such member, and another of said other resilient rods for such member is connected therewith inwardly of the ends of such supporting rods.

11. A structure of the character set forth in claim 9 in which each of said members is cross-shaped, said first mentioned rods being connected with the ends of the arms of the related cross member which are disposed in one plane, and said other of said rods for such member being connected with the arms thereof which are disposed in a plane perpendicular to said first mentioned plane.

References Cited in the file of this patent

UNITED STATES PATENTS

| 2,313,893 | Rushing | Mar. 16, 1943 |
| 2,537,917 | Simmons | Jan. 9, 1951 |
| 2,687,270 | Robinson | Aug. 24, 1954 |
| 2,704,196 | Beach | Mar. 15, 1955 |

FOREIGN PATENTS

| 640,631 | Great Britain | July 26, 1950 |